(12) United States Patent
Shin et al.

(10) Patent No.: US 8,495,204 B2
(45) Date of Patent: Jul. 23, 2013

(54) REMOTE INVOCATION MECHANISM FOR LOGGING

(75) Inventors: Brian J. Shin, Boston, MA (US); Andrew S. Wilson, Manchester, NH (US)

(73) Assignee: Visible Measures Corp., Boston, MA (US)

( * ) Notice: Subject to any disclaimer, the term of this patent is extended or adjusted under 35 U.S.C. 154(b) by 569 days.

(21) Appl. No.: 11/774,120

(22) Filed: Jul. 6, 2007

(65) Prior Publication Data

US 2008/0010339 A1   Jan. 10, 2008

Related U.S. Application Data

(60) Provisional application No. 60/818,797, filed on Jul. 6, 2006.

(51) Int. Cl.
  *G06F 15/173* (2006.01)
  *G06F 11/00* (2006.01)

(52) U.S. Cl.
  USPC ............................................ 709/224; 726/22

(58) Field of Classification Search
  USPC ........................................................ 709/224
  See application file for complete search history.

(56) References Cited

U.S. PATENT DOCUMENTS

| | | | |
|---|---|---|---|
| 5,991,802 A | 11/1999 | Allard et al. | |
| 6,470,388 B1 * | 10/2002 | Niemi et al. | 709/224 |
| 6,591,228 B1 * | 7/2003 | Hall et al. | 702/187 |
| 6,677,858 B1 * | 1/2004 | Faris et al. | 340/573.1 |
| 6,985,901 B1 * | 1/2006 | Sachse et al. | 1/1 |
| 6,988,126 B2 * | 1/2006 | Wilcock et al. | 709/204 |
| 7,051,119 B2 * | 5/2006 | Shafron et al. | 709/248 |
| 7,143,347 B2 * | 11/2006 | Su | 715/208 |
| 7,610,309 B2 * | 10/2009 | Burger et al. | 707/104.1 |
| 7,620,948 B1 * | 11/2009 | Rowe et al. | 717/171 |
| 7,860,751 B2 * | 12/2010 | Mangalick et al. | 705/26.41 |
| 8,225,392 B2 * | 7/2012 | Dubrovsky et al. | 726/22 |
| 8,364,540 B2 * | 1/2013 | Soroca et al. | 705/14.64 |
| 2001/0044787 A1 * | 11/2001 | Shwartz et al. | 705/78 |
| 2003/0144873 A1 | 7/2003 | Keshel | |
| 2004/0049737 A1 * | 3/2004 | Simon Hunt et al. | 715/513 |
| 2004/0133848 A1 * | 7/2004 | Hunt et al. | 715/500 |
| 2004/0168122 A1 * | 8/2004 | Kobipalayam Murugaiyan | 715/513 |
| 2005/0086643 A1 * | 4/2005 | Shane | 717/124 |
| 2005/0125271 A1 | 6/2005 | Peltz | |
| 2005/0203747 A1 * | 9/2005 | Lecoeuche | 704/270.1 |
| 2005/0216844 A1 * | 9/2005 | Error et al. | 715/745 |
| 2005/0251536 A1 * | 11/2005 | Harik | 707/200 |
| 2005/0251856 A1 * | 11/2005 | Araujo et al. | 726/12 |
| 2005/0262092 A1 * | 11/2005 | Beartusk et al. | 707/10 |
| 2005/0273849 A1 * | 12/2005 | Araujo et al. | 726/12 |
| 2006/0085420 A1 * | 4/2006 | Hwang | 707/10 |
| 2006/0136309 A1 * | 6/2006 | Horn et al. | 705/26 |
| 2007/0118844 A1 * | 5/2007 | Huang et al. | 719/330 |

(Continued)

*Primary Examiner* — Tammy Nguyen
*Assistant Examiner* — James Edwards
(74) *Attorney, Agent, or Firm* — David H. Judson

(57) ABSTRACT

One or more events occurring within a client-side web application are logged at a remote server using a script-based invocation mechanism. The mechanism comprises a client-side script, and associated server-side code. Upon occurrence of an event to be logged, a script object is created on the client and used to pass logged data to the server, which then issues a response to destroy the script object. In this manner, the script object is created and persists in the client only as long as it is needed to log the event.

12 Claims, 13 Drawing Sheets

U.S. PATENT DOCUMENTS

2007/0250618 A1* 10/2007 Hammond .................... 709/224
2009/0222329 A1* 9/2009 Ramer et al. .................... 705/10
2012/0072539 A1* 3/2012 Artz et al. ..................... 709/218
2013/0055097 A1* 2/2013 Soroca et al. ................. 715/738

* cited by examiner

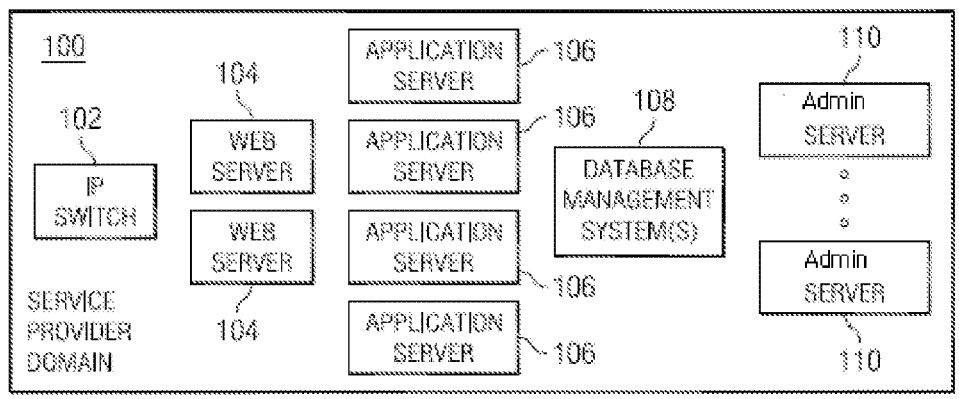
Figure 1
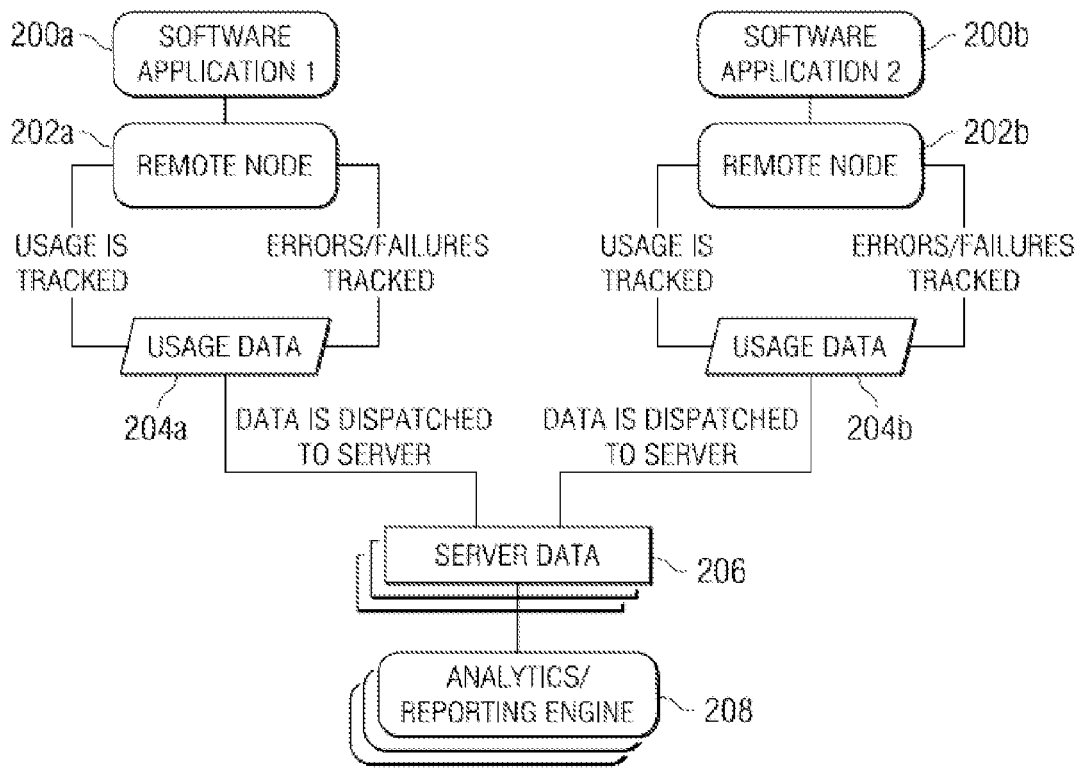

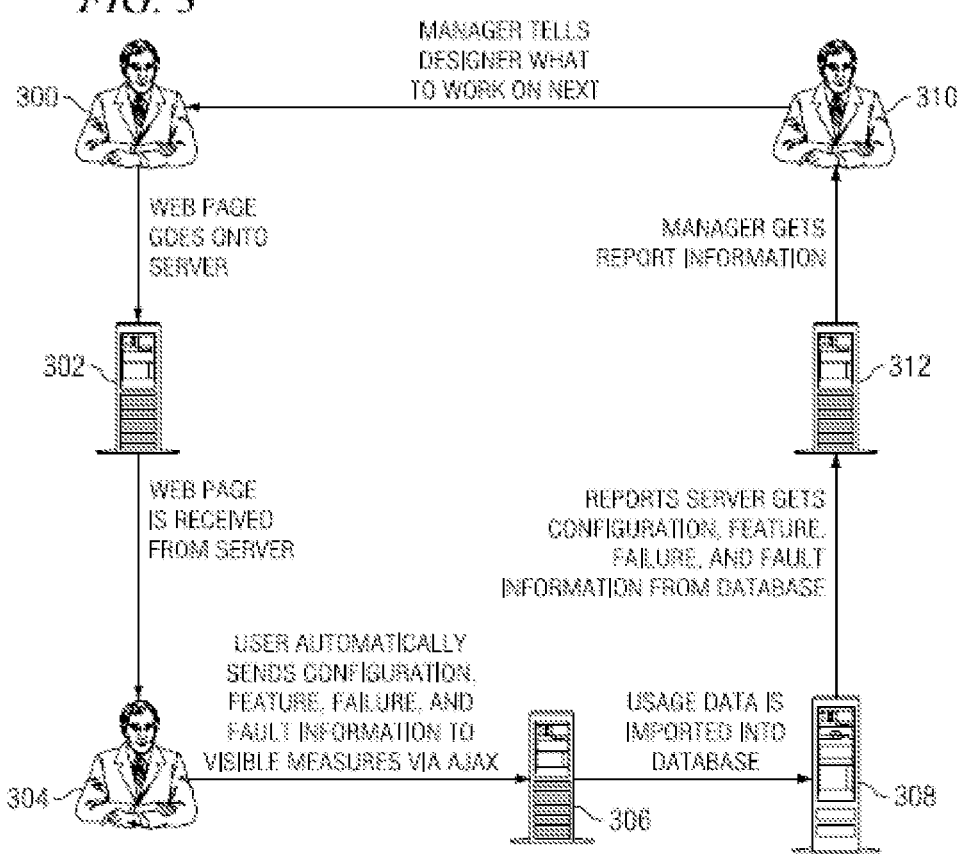

```
<html>
<head>
<script type="text/javascript">
function open_win()
{
alert('clicked');
}
</script>
</head>

<body>
<form>
<input type=button value="Click here" onclick="open_win()">
</form>
</body>

/html>
```

Figure 6

```
<html>
<head>
```
700 — `<script type="text/javascript" language="JavaScript" src="http://ria.visiblemeasures.com/VisibleMeasures.js"></script>`
702 — `<script type="text/javascript">`
`$INIT("Project 1", "Build 2", "Test API");`
`</script>`
```
<script type="text/javascript">
function open_win()
{
alert('clicked');
}
</script>
</head>

<body>
<form>
<input type=button value="Click here" onclick="open_win()">
</form>
</body>

</html>
```

Figure 7

```
<html>
<head>
<script type="text/javascript" language="JavaScript"
src="http://ria.visiblemeasures.com/VisibleMeasures.js"></script>
<script type="text/javascript">
$INIT("Project 1", "Build 2", "Test API");
</script>
<script type="text/javascript">
function open_win()
{
alert('clicked');
$FEATURE('open_win');
}
</script>
</head>

<body>
<form>
<input type=button value="Click here" onclick="open_win()">
</form>
</body>

</html>
```

800 — $FEATURE('open_win');

Figure 8

```
dispatch: function (array)
{
try
{
array.push("project=" + escape(this.project));
array.push("build=" + escape(this.build));
array.push("container=" + escape(this.container));
array.push("user=" + escape(this.getUser()));
var objectId = "" + this.getObjectId();
array.push("objectId="+ escape(objectId));

var params = array.join("&");
var scriptElement = document.createElement("script");
scriptElement.id= objectId;
scriptElement.defer="defer";
scriptElement.src=this.url+"/log?" + params;
try
{
var tag = document.getElementsByTagName("head").item(0);
if ( tag != null )
{
tag.appendChild(scriptElement);
}
} catch (err)
{
$D("Error: Cannot add element to document: " + err);
}
} catch (exc)
{
$D("Error: Cannot add element to document: " + exc);
}

```
<html>
<head>
<script type="text/javascript" language="JavaScript"
src="http://ria.visiblemeasures.com/VisibleMeasures.js"></script>
<script type="text/javascript">
$INIT("Project 1", "Build 2", "Test API");
</script>
<script type="text/javascript">
function open_win()
{
alert('clicked');
$FEATURE('open_win');
}
</script>
<script defer=" defer" id="3231"
src="http://ria.visiblemeasures.com/log?project=testProject&build=testBuild
&container=http://foo.com&orbjectId=3231&seq=1&type=2&feature=open_
win()"/>
</head>

<body>
<form>
<input type=button value="Click here" onclick="open_win()">
</form>
</body>

</html>
```

```
<html>
<head>
<script type="text/javascript" language="JavaScript"
src="http://ria.visiblemeasures.com/VisibleMeasures.js"></script>
<script type="text/javascript">
$INIT("Project 1", "Build 2", "Test API");
</script>
<script type="text/javascript">
function open_win()
{
alert('clicked');
$FEATURE('open_win');
}
</script>
<script defer=" defer" id="3231"
src="http://ria.visiblemeasures.com/log?project=testProject&build=testBuild
&container=http://foo.com&orbjectId=3231&seq=1&type=2&feature=open_
win()"/>
VisibleMeasuresDeleteScript("3231");
</script>
</head>

<body>
<form>
<input type=button value="Click here" onclick="open_win()">
</form>
</body>

</html>
```

1300 — VisibleMeasuresDeleteScript("3231");

Figure 13

```
function VisibleMeasuresDeleteScript(scriptId)
{
try
{
setTimeout("VisibleMeasuresDeleteScriptObject('" + scriptId + "')", 500);
} catch (err)
{
$D("Error: Cannot delete script object: " + err);
}
} function VisibleMeasuresDeleteScriptObject(scriptId)
{
var element = document.getElementById(scriptId);
if ( typeof element != "undefined" && element != null )
{
var parent = element.parentNode;
if ( typeof parent != "undefined" && parent != null )
{
parent.removeChild(element);
} else
{
//$D ( "Parent: " + parent +"\n" + "Element: " + element);
}
} else
{
//$D ("Element: " + element);
}
}
```

Figure 15

REMOTE INVOCATION MECHANISM FOR LOGGING

This application includes subject matter that is protected by copyright.

This application is based on and claims priority from Ser. No. 60/818,797, filed Jul. 6, 2006.

CROSS-REFERENCE TO RELATED APPLICATION

This application is related to U.S. Ser. No. 11/481,530, filed Jul. 6, 2006.

BACKGROUND OF THE INVENTION

1. Technical Field

The present invention relates generally to software and rich media monitoring, tracking, and return on investment (ROI) analysis.

2. Description of the Related Art

It is known in the prior art to provide methods and systems for centrally coordinating, collecting and storing error, trace, audit and other information in a computer network. A representative example is U.S. Pat. No. 6,470,388. In this patent, selected applications or processes running at various entities or hosts within the network instantiate one or more "debug" objects that collect given information. Each entity also includes at least one logging service layer that communicates with the application or process, and includes a communications resource and one or more state machine engines. In response to collecting error, trace, audit or other information, each debug object passes that data to the respective logging service layer, which decides whether to forward the data to a centralized logging facility disposed within the network. The forwarding of collected information depends on the state of the debug object. At the centralized logging facility, the information is time-stamped and appended to a log file along with the application's name and the name of the entity or host at which the application is running.

Another representative patent is U.S. Pat. No. 6,591,228. In this patent, a logging service logs to a centralized log diagnostic messages from applications executing in a computing environment in which a plurality of computers are coupled to data storage area. Each computer has one or more subsystems that execute applications. A logging service API writes diagnostic messages to the data storage and, depending on the type of problem, contacts an alert facility.

BRIEF SUMMARY OF THE INVENTION

One or more events occurring within a client-side web or rich media application are logged at a remote server using a script-based invocation mechanism. The mechanism comprises a client-side script, and associated server-side code. Upon occurrence of an event to be logged, a script object is created on the client and used to pass logged data to the server, which then issues a response to destroy the script object. In this manner, the script object is created and persists in the client only as long as it is needed to log the event.

According to a representative embodiment, a markup language page is instrumented with a control script, together with at least one tracking method that is associated with an action handler on the page. In operation, the control script dynamically imports a logging API (e.g., a script object) into the page whenever the action handler is executed but then promptly destroys the API after the logged data is sent to a logging server. In particular, upon execution of the action handler, the control script creates a script object in the page "on-the-fly," and that object then opens a connection to a logging server and passes the logged data, preferably as a set of http parameters. The logging server logs the event (e.g., feature execution, a fault, a failure, or other event that is being tracked) and issues a response that causes the control script to destroy the just-created script object. The script object may be destroyed gracefully (i.e. over a given time period).

Thus, the control script creates the script object dynamically when an instrumented event occurs and that script object is used to remotely invoke the logging server to log the data that is passed from the script object. The logging server response causes the control script to destroy (cleanup) the script object, as it is no longer needed once the logged data has been received and logged at the server.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

FIG. 1 is a block diagram of a service provider infrastructure that provides application logging and analytics as a managed service;

FIG. 2 illustrates the basic logging service wherein application instances are instrumented to provide usage data sets that are then delivered to a remote logging server;

FIG. 3 illustrates how the hosted service can be used to provide feedback to a developer during a software development process;

FIG. 6 illustrates a portion of an HTML markup page that is instrumented to provide remote logging according to an embodiment of the present invention;

FIG. 7 is the HTML of FIG. 6 after a control script has been included;

FIG. 8 is the HTML of FIG. 7 after instrumentation logging code has been included;

FIG. 10 is illustrative dispatch code that executes on the client side of the remote invocation mechanism;

FIG. 11 illustrates how the script object is created dynamically on the client side of the connection;

FIG. 13 illustrates the client side code after the delete script has been written in the script object;

FIG. 15 illustrates a client side delete script object method; and

DETAILED DESCRIPTION OF THE PREFERRED EMBODIMENT

Figure 4:
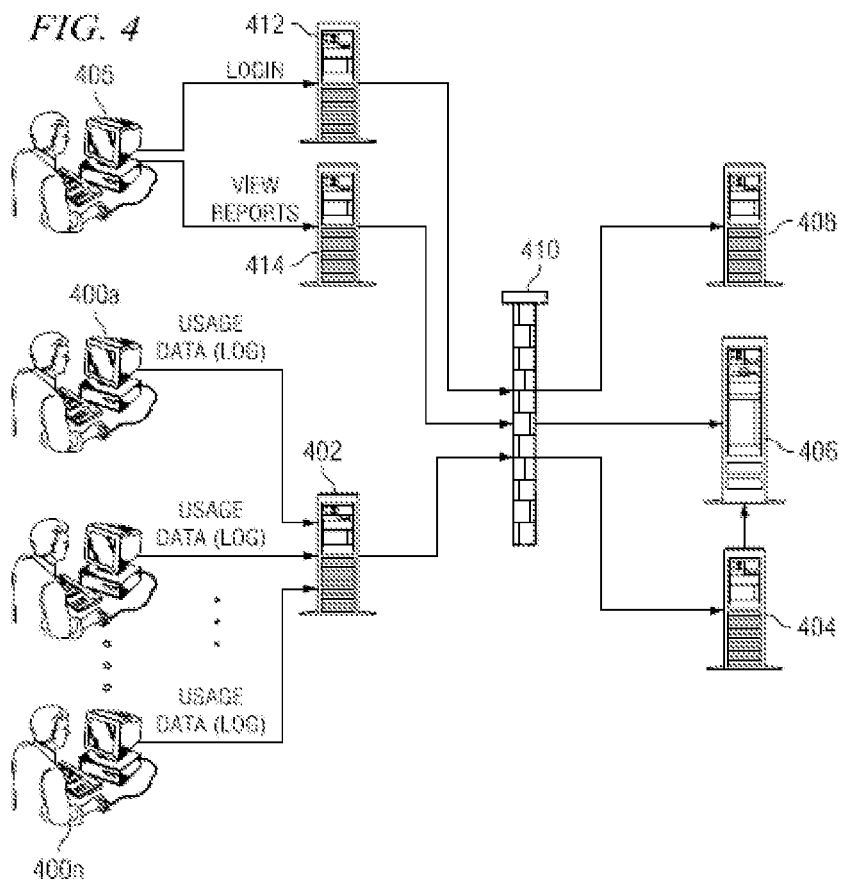
FIG. 4 provides a more detailed implementation of the hosted service.

FIG. 1 illustrates a representative service provider or system architecture, which in one embodiment is implemented in or across one or more data centers. A data center typically has connectivity to the Internet. The system provides a web-based hosted solution through which application developers (or others such as IT personnel) create, manage and monitor application usage analytics in an online manner. Participants may interact with the platform as a hosted service. In an alternative embodiment, the system may be implemented over a private network, or as a product (as opposed to a hosted or managed service).

A user of the service has an Internet accessible machine such as a workstation or notebook computer. Typically, the user accesses the service provider architecture by opening a web browser on the machine to a URL associated with a service provider domain or sub-domain. The user then authenticates to the managed service in the usual manner, e.g., by entry of a username and password. The connection between the machine and the service provider infrastructure may be encrypted or otherwise secure, e.g., via SSL, or the like. Although connectivity via the publicly-routed Internet is typical, the user may connect to the service provider infrastructure over any local area, wide area, wireless, wired, private or other dedicated network. As seen in FIG. 1, the service provider architecture 100 comprises an IP switch 102, a set of one or more web server machines 104, a set of one or more application server machines 106, a database management system 108, and a set of one or more administration server machines 110. A representative web server machine 104 comprises commodity hardware (e.g., Intel-based), an operating system such as Linux, and a web server such as Apache 2.x. A representative application server machine 106 comprises commodity hardware, Linux, and an application server. The database management system 108 may be implemented as an Oracle (or other) database management package. In a high volume use environment, there may be several web server machines, several application server machines, and a number of administrative server machines. Although not shown in detail, the infrastructure may include a name service, other load balancing appliances, other switches, network attached storage, and the like. The system typically will also include connectivity to external data sources, such as third party databases. Each machine in the system typically comprises sufficient disk and memory, as well as input and output devices. Generally, the web servers 104 handle incoming business entity provisioning requests, and they export a display interface that is described and illustrated in more detail below. The application servers 106 manage the data and facilitate the functions of the platform. The administrator servers 110 handle all back-end accounting and reporting functions. The particular hardware and software implementation details described herein are merely for illustrative purposes are not meant to limit the scope of the present invention.

FIG. 2 illustrates a basic operation of a logging service. In this example, application instances 200a and 200b have been instrumented with a usage monitoring API. The usage monitoring API is sometimes referred to as a remote node. Thus, application instance 200a has associated therewith the remote node 202a and application instance 200b has associated therewith the remote node 202b. Of course, the use of two instances is merely illustrative, as the system is designed to provide a highly scalable distributed logging service wherein a large number of instances of the deployed application are instrumented and tracked. In operation, the remote node 202a generates usage data set 204a, and remote node 202b generates usage data set 204b. This usage data is transported in a highly efficient manner (as will be described below) to a central server (or to a set of servers), where the data sets are aggregated (reference numeral 206) and processed within an analytics and reporting engine 208.

The subject matter herein is useful in the context of software development and testing, although one of ordinary skill in the art will appreciate that the subject matter is not limited to such use. FIG. 3 illustrates a representative business case. In this example, a web application developer 300 adds the usage monitoring API into the web application or rich Internet application under development. The application so instrumented is then made available from a web site or other publishing server 302. An end user 304 navigates to the site and downloads and interacts with the application to generate usage data. This data is sent to the logging server 306, which then uploads such data to the hosted service database 308. A manager 310 (or the developer 300) can then log into the hosted service web site 312 and access the logged data.

FIG. 4 illustrates an operation of the hosted service in more detail. In this example, a large number of end users 400a-400n use the application and generate usage data sets that are provided to the logging server 402. The logging server 402 may comprise one or more servers. The logging server 402 periodically uploads the data sets through firewall 410 to an application server 404, which stores the processed data in a database 406. The user 405 of the hosted service logs into the service through server 412 and views the usage reports through server 414, which accesses the usage data through the firewall 410.

The application under test is one of: application software (such as a program written in Java, Net, or the like), a script-enabled web application (such as a web page including Javascript, ActiveScript or the like), or a Rich Internet Application (RIA) (e.g., Flash, AJAX-enabled, DHTML, or the like). During the development process, a usage monitoring API is integrated into the application and the application is deployed. As users interact with the application, a log file is generated, typically in one of two ways. If the application is able to write to a local file system (in the user's machine), usage information is gathered in a log file local to the deployed application and then dispatched to an upload server for processing in a batch manner. If the application is not able to write to the user machine's local file system (because, for example, it is a web application or RIA), the usage information is sent to a remote logging server, preferably on a just-in-time basis, and then the log file is generated on the logging server. This is the technique used for web browser-based logging, as will be described in more detail below. Preferably, such logging is accomplished by transmitting the data through http URL parameters to the logging server, which then translates the data into a log file. In either case, preferably the usage information that is tracked comprises "features," "faults" and "failures" of the application, independent of platform, location, and number of deployed application instances. In general, any application-related event or occurrence may be logged. As noted above, "feature" data refers generally to a collection of information such as which features were used, when, in what order, by whom, on what platform, and with what end-user environment. Typically, features are exposed to end users. The "fault" data refers generally to which features caused programmatic errors (e.g., exceptions). The "failures" data identifies which features failed to complete successfully, for example, if data was entered into a field in an incorrect format.

Figure 5:
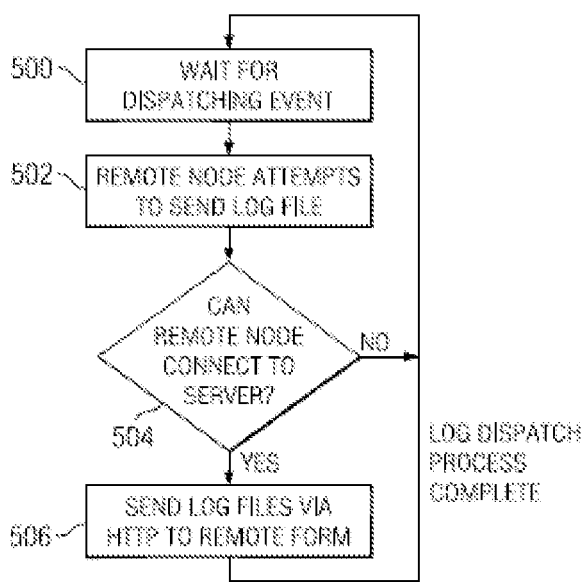
FIG. 5 is a process flow diagram for an embodiment where collected log data is capable of being written to the local file system.

FIG. 5 is a process flow for the case where the application has the ability to write a log file to the local file system. The remote node waits for a dispatching event 500, which causes the remote node to connect to a user defined URL. At step 502, the remote node attempts to connect to the logging server. A test at step 504 determines whether the remote node can connect to the server. If so, at step 506 the remote node then sends all log files, e.g., by submitting them to an HTML form on an HTML page specified by the URL. Preferably, the remote node then deletes the successfully dispatched log files.

The following description provides additional details for the embodiment where the application under test is a script-enabled web application or a RIA. As noted above, this is the case where a log file cannot be written to an end user machine local file system. In such case, it is necessary to provide another mechanism to transfer the usage information to a remote logging server. The present invention facilitates this process by a client-side script remote invocation mechanism. As will be described, the remote invocation mechanism remotely (from the logging server's perspective) manages a user's web browser to be able to execute and then clean up script objects dynamically. This technique provides a way to log and track the execution and failures of features in a web-based application or RIA.

As noted above, the mechanism comprises a client-side script, and associated server-side code. Upon occurrence of an event to be logged, a script object is created on the client and used to pass logged data to the server, which then issues a response to destroy the script object. In this manner, the script object is created and persists in the client only as long as it is needed to log the event.

A basic implementation of the solution to track the usage of web applications, Rich Internet Applications, or other application software is as follows. Assume a developer has a web page containing some actionable object such as a button. FIG. 6 illustrates a representative portion of the markup language page prior to the inclusion of any code associated with the present invention. The particular actionable object on which an event is logged is not a limitation of the invention of course, as the remote invocation mechanism may be triggered upon any occurrence associated with the page. According to one embodiment, a developer inserts code (in particular, a control script) into the source code file, as indicated in FIG. 7. The control script is delimited by the first set of <script> . . . </script>tags in lines 3-5 of the page markup. This is reference numeral 700. As will be seen, when the action is triggered (in this example, user selection of the button), the control script imports into the page markup a script logging API (to be loaded from a remote server) that passes the logged data to the logging server. As indicated in FIG. 7 between the second set of <script> . . . </script>tags 702, the developer may also specify configuration information associating the logging for the page to a project within the hosted service provider's database. This is the "Project 1," "Build 2," "Test API" information as shown in this example.

As indicated in FIG. 8, to provide the "trigger," the developer then adds a feature tracking method to the action handler. In this example, this trigger is the $FEATURE( ) tracking method 800, which (in this example) logs that an alert window has been opened as a result of the user clicking on the button. With the inclusion of the control script and the feature tracking method, as will be seen the application is now able to track feature executions and failures, as well as other application events or usage parameters, via the remote logging mechanism. The instrumentation as described above may be included in the page at any time.

Figure 9:
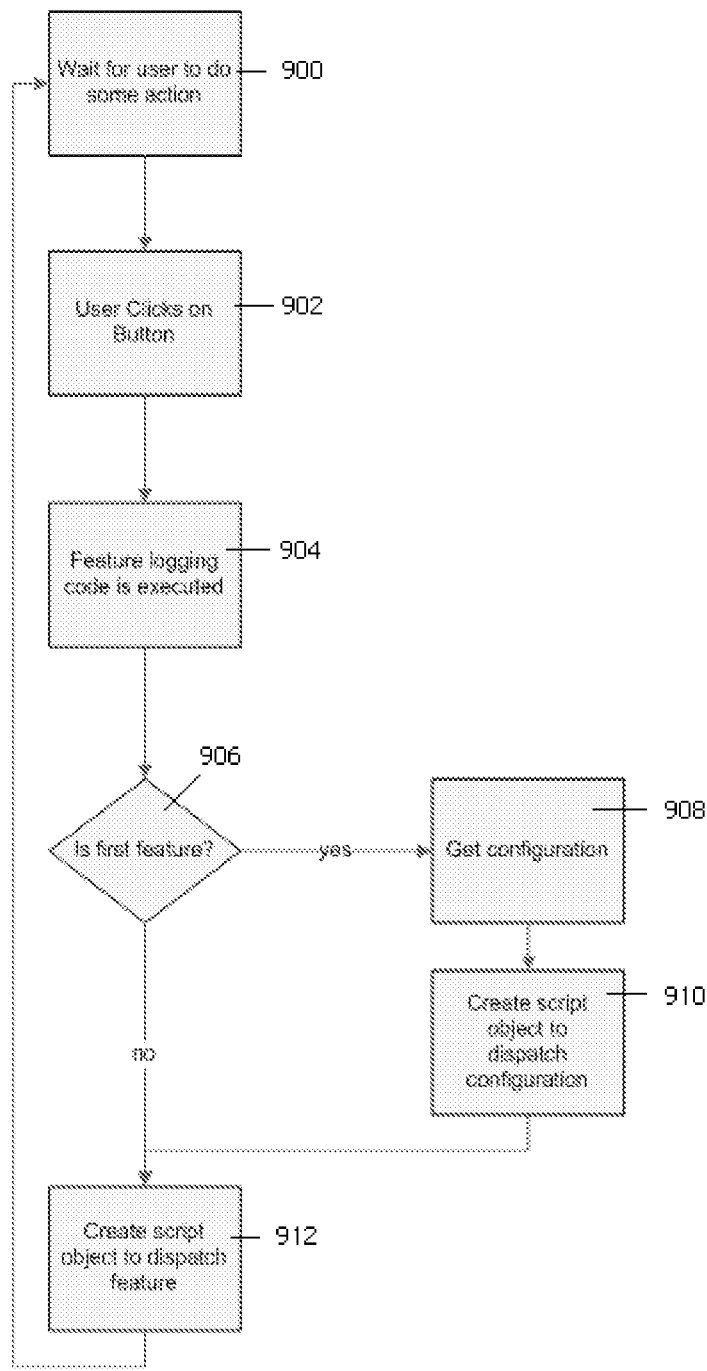
FIG. 9 illustrates a process flow at the client that invokes the logging mechanism.

With reference now to FIG. 9, logging is carried out as follows. It is assumed that the page is loaded by the user's web browser. The browser sees the .src attribute of the script tag and loads the javascript file (in the case identified by the URL . . . //ria.visiblemeasures.com/VisibleMeasures.js). The function of the javascript file is to control the remote invocation mechanism. The browser executes the follow-up script object and then renders to the user the remaining portions of the page. Step 900 illustrates a wait for the user to take some action. When the user later clicks on the button that has been instrumented with the logging code at step 902, the browser executes the associated open_win( ) method. The open_win( ) method in this example executes the alert( ) method and displays an alert box. The open_win( ) method also executes the $FEATURE( . . . ) tracking method at step 904, which causes a series of additional operations to occur. In particular, a test is performed at step 906 to determine whether this is the first logged message for the $FEATURE. If so, configuration information is obtained at step 908. At step 910, a script object is created to dispatch the configuration information to the logging server. After step 910, or if the outcome of the test at step 906 is negative, a script object is created to dispatch the logged message(s) to the logging server.

The following describes how the dispatching mechanism works in a representative embodiment. As noted above, it is assumed that a series of one or more elements (e.g., a feature, a failure, a fault, some other event being tracked or the like) have been associated with the application. When a particular element is triggered, the control script in the page invokes the javascript code that was included in the page via the .src include of the js file. The included javascript, a portion of which is illustrated in FIG. 10, causes a script object to be dynamically created in the HTML. FIG. 11 illustrates the new script object 1100 (also shown in bold) that is inserted into the client-side HTML dynamically (on-the-fly) as a result of the execution of the javascript include file being triggered by the event being tracked. The new script object 1100 opens a connection to the server specified in the URL parameter and appropriate server code executes to log the event data. As can be seen, the code illustrated in FIG. 10 acts as an interface to the log server.

Figure 12:
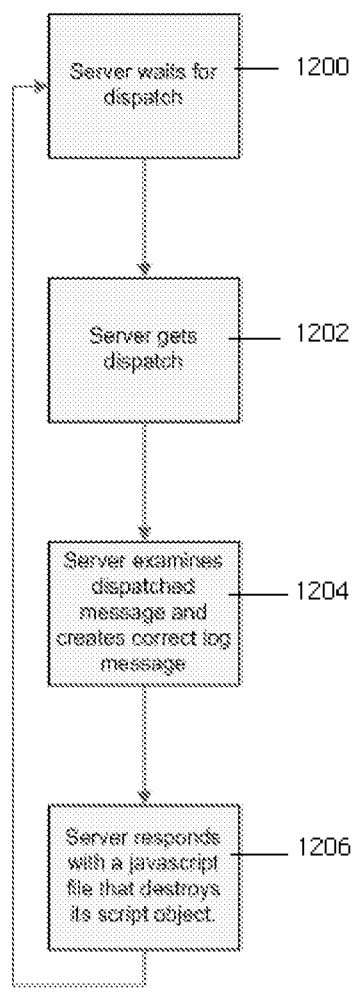
FIG. 12 illustrates a process flow at the server for logging the data received from the client side.

With reference to the process flow of FIG. 12, the server is assumed to be waiting for a dispatch at step 1200. In this example, at step 1202 the server then receives from the newly-created script object a request for the document that can be found as the URL: . . . //ria.visiblemeasures.co/log?project=testProject&build=TestBuild&container=http://fo o.com&objecteId=3231&seq=1&type=2&feature=open_win( ). Of course, the above URL is merely representative. At step 1204, the logging server then extracts one or more data items from this URL, such as:
1. Project=testProject
2. Build=testBuild
3. Container=http://foo.com
4. ObjectId=3231
5. Type=2
6. Feature=open_win ()

The Type field is used to determine the kind of message, where type 1 is configuration information, type 2 is a feature, type 3 is a failure, and type 4 is a fault. These type values are merely representative. Preferably, the Project, Build, Container and feature values are added to the log file in the form of various log messages. Once the server has completed the logging operation, the server then responds at step 1206 by generating and serving a new script file that will facilitate the deletion of the script object on the client.

The following is a representative script file for this purpose:
VisibleMeasuresDeleteScript ("3231")

As can be seen, the delete script references the objectId value.

Figure 14:
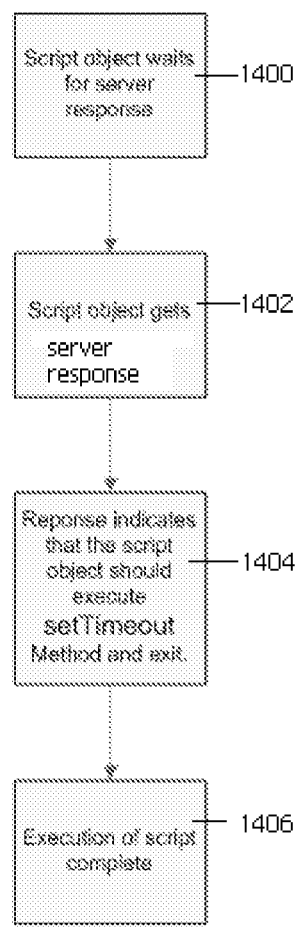
FIG. 14 illustrates a process flow at the client following passing of the log data to the server side.
Figure 16:
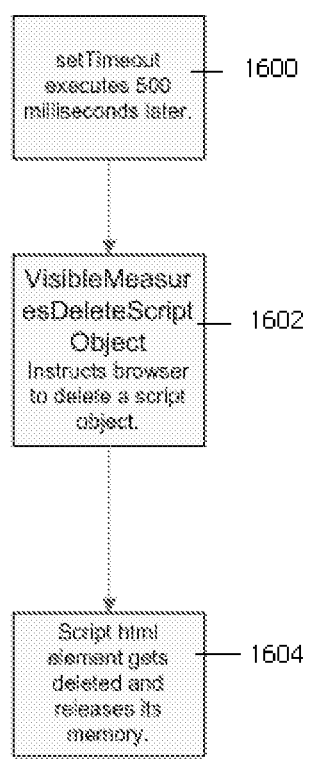
FIG. 16 illustrates the operation of a client side method that performs the script object clean up.

The control script receives the server response and, using the objectId value for identification, writes the delete script right back into the script object, as shown in FIG. 13. In particular, and as illustrated in FIG. 14, the script object is assumed to be waiting for the server response at step 1400. Step 1402 illustrates the script object 1402 writing the delete script back into the script object. This has the effect of causing a setTimeout method of the control script to be called. In particular, preferably the control script includes the following code:

setTimeout("VisibleMeasuresDeleteScriptObject("'+ scriptId+"')", 500). This code is executed so that the script object can exit gracefully before being destroyed. This is step 1404 in FIG. 14. In particular, the setTimeout method schedules the execution of another method, in this case the "VisibleMeasuresDeleteScriptObject" method, which will execute at 500 milliseconds (which is merely representative). FIG. 15 illustrates the VisibleMeasuresDeleteScriptObject method, which is located in the control script. FIG. 16 illustrates the setTimeout method. The setTimeout method begins at step 1600. At step 1602, the VisibleMeasuresDeleteScriptObject instructs the browser to delete the script object (which was reference numeral 1100 in FIG. 11). At step 1604, the script object HTML is deleted and releases associated system memory. This indicates that processing is complete, as represented by step 1406.

Thus, the delete script returned from the log server has the effect of causing the script object (that passed the data from the client to the server) to be deleted (cleaned up). In particular, the delete script object method tries to load the page element defined by the objectId. As indicated by the code in FIG. 15, several steps try to verify that the object exists. The container of the element is found and then instructed to delete the script object.

This remote invocation method as has been described is advantageous. The script objects can load content from any web site. They can be created in large numbers and sequentially to ensure that all log data is passed to the server. Preferably, one script object is created for every log operation (although this is not a requirement), which allows the one or more dynamically-generated script objects to run asynchronously to the rest of the web page. This technique does not interfere with the user's normal interaction with the page, nor is any logged data lost in the logging process. The system only allocates what it needs for HTML elements, and only when needed.

The use of HTML as the markup language is not meant to be limiting, nor is the use of Javascript. Any markup language (e.g., SGML, XML, XHTML, or the like) may be instrumented to include an appropriate client-side script (e.g., ActiveScript, VBScript, ECMAScript, Python, and many others) to facilitate the remote invocation mechanism.

The remote invocation method described herein is not limited for use for logging, as it may be implemented for any just-in-time or on-the-fly data transport operation that may be desired between a client and a remote server.

As previously noted, the hardware and software systems in which the invention is illustrated are merely representative. The invention may be practiced, typically in software, on one or more machines. Generalizing, a machine typically comprises commodity hardware and software, storage (e.g., disks, disk arrays, and the like) and memory (RAM, ROM, and the like). The particular machines used in the network are not a limitation of the present invention. A given machine includes network interfaces and software to connect the machine to a network in the usual manner. As illustrated in FIG. 1, log server may be part of a managed service (e.g., in an ASP model) using the illustrated set of machines, which are connected or connectable to one or more networks. More generally, the service is provided by an operator using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, ASP), and a set of applications or processes (e.g., Java applets or servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

The hosted service may be implemented in a multi-server cluster environment that is designed to scale efficiently. Each server is designated with a primary and secondary series of tasks. Preferably, one server is dynamically set to be a master server, which server determines the secondary tasks to be performed by all servers. All servers update their existence within a database, and the servers cooperate to determine which server will be the master. The servers in the cluster are assigned tasks (such as log import and event processing) by the master server.

Having described our invention, what we now claim is set forth below.

The invention claimed is:

1. A method operative in a client having a web browser that renders a markup language page, comprising: receiving the markup language page in the web browser; upon occurrence of an event, dynamically creating and inserting a script object into the markup language page, the script object being a distinct set of instructions, wherein the script object is not present in the markup language page when the markup language page is received in the web browser; executing the script object to collect data concerning the event and to forward that data to a server, wherein the data describes one of: a feature, a fault, and a failure; and upon receipt of a response from the server, destroying the script object by removing the set of instructions from the markup language page.

2. The method as described in claim 1 wherein the response from the server is a delete script that is written into the markup language page.

3. The method as described in claim 2 wherein the delete script causes the script object to be deleted from the markup language page after a given timeout.

4. The method as described in claim 1 wherein the event is an action associated with a given markup language page object.

5. The method as described in claim 1 wherein the data is forwarded to the server via http.

6. The method as described in claim 1 wherein the server is operated within a managed service.

7. The method as described in claim 1 wherein the script object is a Javascript object.

8. Apparatus, comprising: a tracking server executed by a processor; and a control script integrated into a markup language page and adapted to be executed by a client browser upon a given occurrence, wherein, upon such execution, the control script (a) dynamically creates and inserts a script object into the markup language page, the script object being a distinct set of instructions that collects and forwards to the server data about the given occurrence, the data being log data that describes one of: a feature, a fault, a failure, and an event, and (b) upon receipt of a response from the server, removes the script object from the markup language page by removing the set of instructions from the markup language page; wherein the script object is not present in the markup language page when the markup language page is received in the web browser.

9. The apparatus as described in claim 8 wherein the response from the server comprises a delete script that the control script writes into the script object to cause the script object to be removed from the markup language page.

10. The apparatus as described in claim 8 wherein the markup language page is associated with a web application, or a Rich Internet Application.

11. A system, comprising: a tracking server executed by a processor; and a script integrated into an application and adapted to be executed upon a given occurrence, wherein, upon such execution, the script (a) dynamically creates and inserts a script object into the application, the script object being a distinct set of instructions that collects and forwards to the server data about the given occurrence, wherein the given occurrence is one of: a feature execution, a feature failure, and a feature fault, and (b) upon receipt of a response from the server, destroys the script object by removing the set of instructions from the markup language page; wherein the script object is not present in the markup language page when the markup language page is received in the web browser; wherein the application is available at a set of client browsers across a network.

12. The system as described in claim 11 wherein the application is a web page having a browser-enabled script, or a Rich Internet Application.

* * * * *